United States Patent
Hermey

(10) Patent No.: US 9,494,215 B2
(45) Date of Patent: Nov. 15, 2016

(54) ENERGY GUIDING CHAIN

(71) Applicant: igus GmbH, Cologne (DE)

(72) Inventor: Andreas Hermey, Hennef (DE)

(73) Assignee: igus GmbH, Cologne (DE)

( * ) Notice: Subject to any disclaimer, the term of this patent is extended or adjusted under 35 U.S.C. 154(b) by 0 days.

(21) Appl. No.: 14/782,413

(22) PCT Filed: Mar. 27, 2014

(86) PCT No.: PCT/EP2014/056132
§ 371 (c)(1),
(2) Date: Oct. 5, 2015

(87) PCT Pub. No.: WO2014/161761
PCT Pub. Date: Oct. 9, 2014

(65) Prior Publication Data
US 2016/0053854 A1 Feb. 25, 2016

(30) Foreign Application Priority Data

Apr. 5, 2013 (DE) .................... 20 2013 101 462 U

(51) Int. Cl.
*F16G 13/16* (2006.01)
*H02G 3/04* (2006.01)

(52) U.S. Cl.
CPC ............ *F16G 13/16* (2013.01); *H02G 3/0475* (2013.01)

(58) Field of Classification Search
CPC .............................. F16G 13/16; H02G 3/0475
(Continued)

(56) References Cited

U.S. PATENT DOCUMENTS 4,570,437 A * 2/1986 Moritz .................... F16G 13/16
16/266
6,067,788 A * 5/2000 Weber ..................... F16G 13/16
248/49

(Continued)

FOREIGN PATENT DOCUMENTS

DE   3714056 C1   8/1988
DE   8910220 U1   10/1989
(Continued)

OTHER PUBLICATIONS

English language PCT Search Report mailed Jul. 30, 2014, in corresponding PCT Application No. PCT/EP14/56132, 2 pgs.
(Continued)

*Primary Examiner* — David B Jones
(74) *Attorney, Agent, or Firm* — Grossman Tucker Perreault & Pfleger, PLLC

(57) ABSTRACT

The invention relates to an energy guiding chain, with chain links (1, 2) each comprising two side straps (3, 4). The side straps (3, 4) form opposite strap strands transversely to their longitudinal direction, where at least some of the opposite side straps (3, 4) are connected to each other by cross-members (5, 6), the ends of at least some of which display a bearing area (7) with an essentially cylindrical journal (10), extending in the longitudinal direction, for pivotable mounting in a bearing seat (8) on an associated side strap (3, 4). To improve the angular stability of the side straps when the cross-member is opened, it is proposed that the journal (10) display a first flattened section (12) on its lateral surface. To receive the journal (10), the bearing seat (8) comprises an essentially cylindrical space (13) with a flattened section (15), where the flattened section (15) of the cylindrical space (13) and the first flattened section (12) of (Continued)

Figure 4:
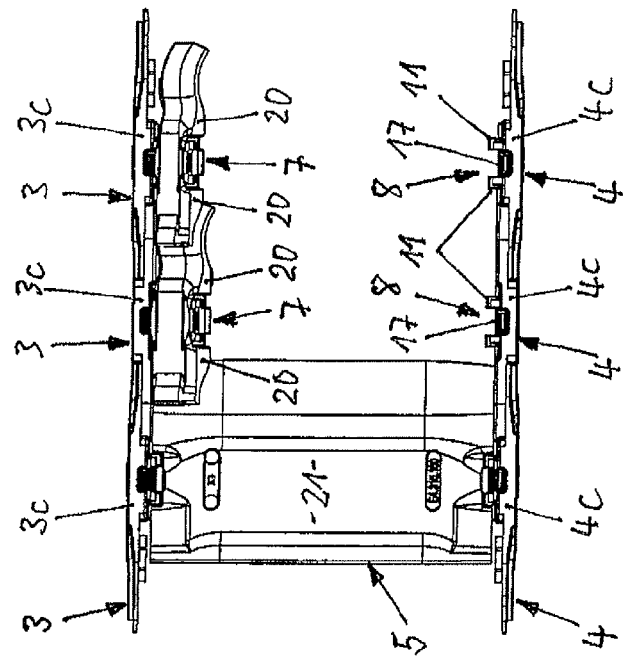

the journal (10) lie opposite each other in a closed position of the cross-member (5, 6).

28 Claims, 5 Drawing Sheets

(58) Field of Classification Search
USPC .............................. 59/78.1, 900; 248/49, 51
See application file for complete search history.

(56) References Cited

U.S. PATENT DOCUMENTS

| | | | |
|---|---|---|---|
| 7,428,808 B2 | 9/2008 | Utaki et al. | |
| 7,520,122 B2* | 4/2009 | Kitagawa | F16G 13/16 248/49 |
| 8,397,480 B2* | 3/2013 | Jaeker | F16G 13/16 248/49 |
| 8,806,847 B2* | 8/2014 | Blase | F16G 13/16 248/49 |
| 2011/0308043 A1* | 12/2011 | Nakasone | E05D 5/125 16/380 |
| 2014/0020358 A1 | 1/2014 | Blase et al. | |

FOREIGN PATENT DOCUMENTS

| | | | |
|---|---|---|---|
| DE | 102004017742 A1 | | 11/2005 |
| DE | 20 2011 004762 | * | 4/2011 |
| JP | S62101277 U | | 6/1987 |

OTHER PUBLICATIONS

English translation of International Preliminary Report on Patentability/Written Opinion mailed Oct. 15, 2015, in corresponding PCT Application No. PCT/EP14/56132, 7 pgs.

* cited by examiner

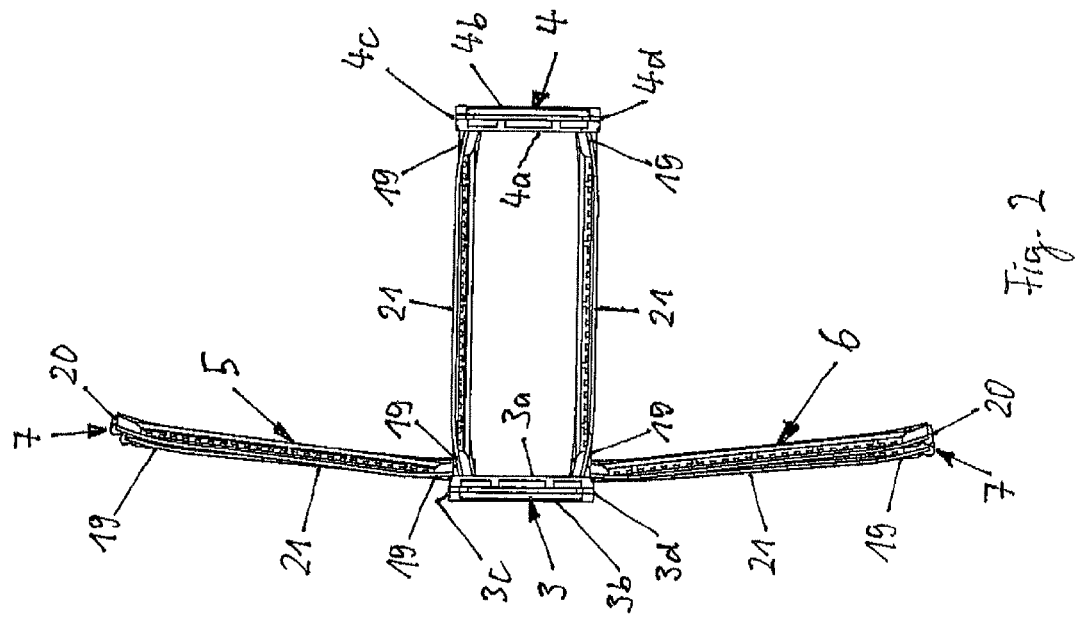
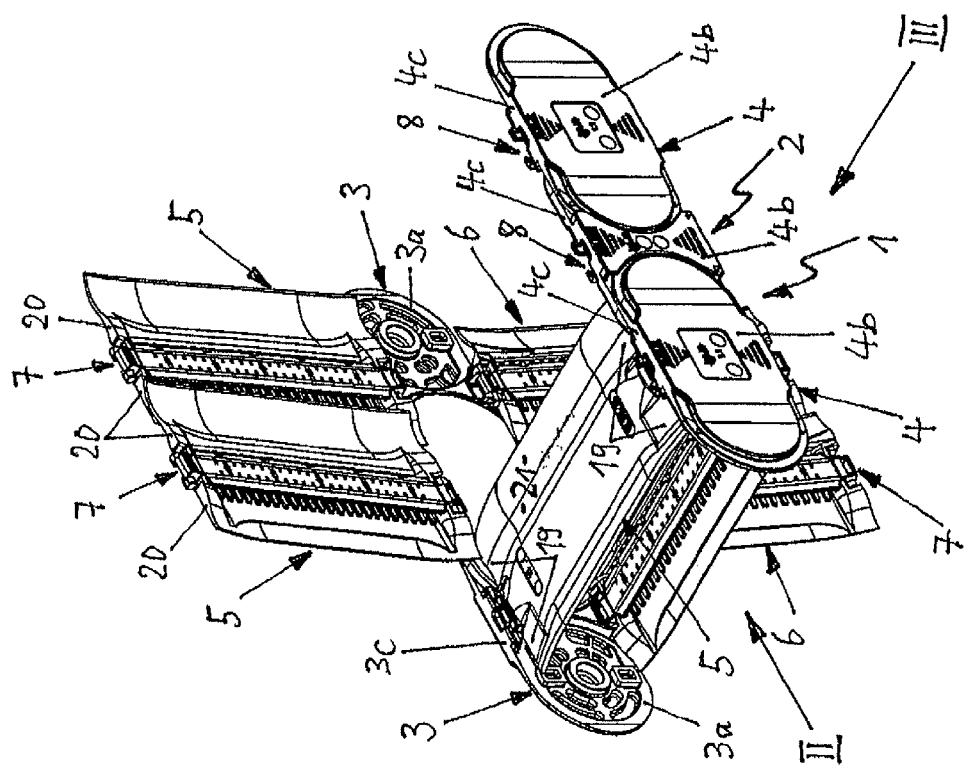

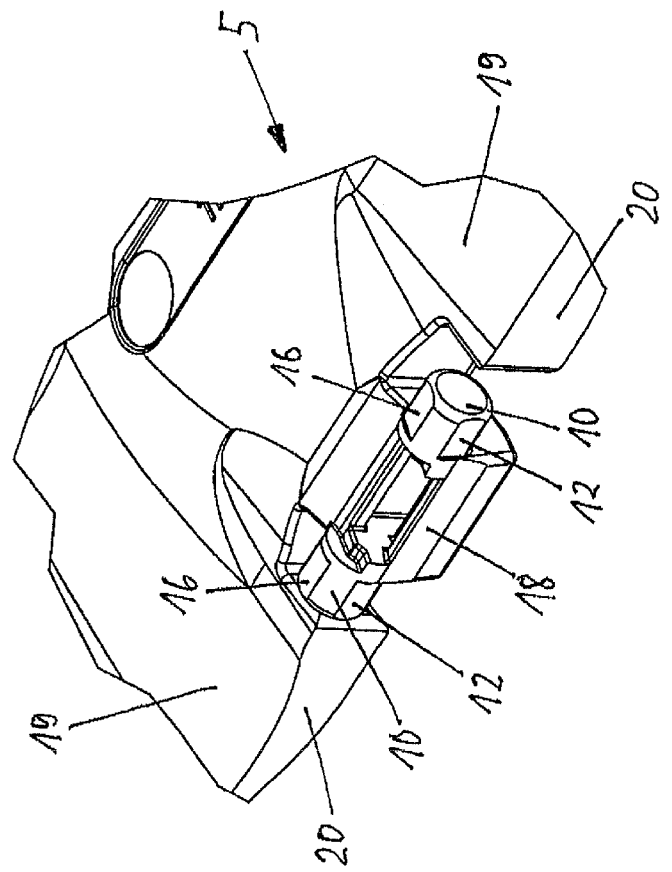
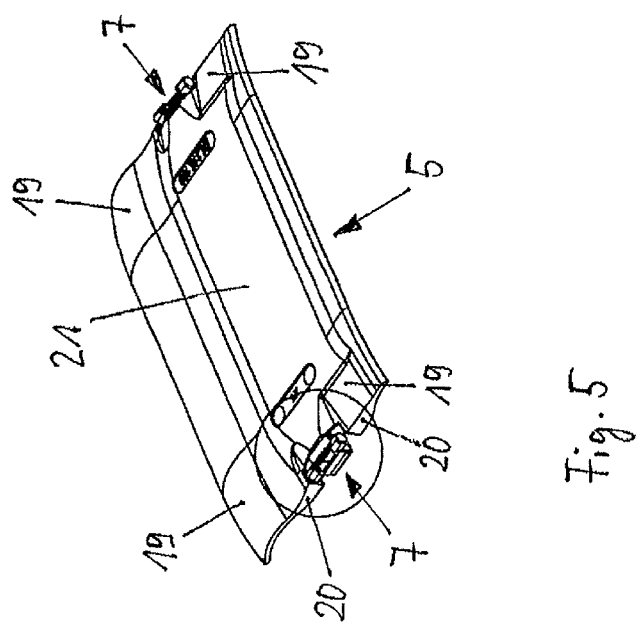

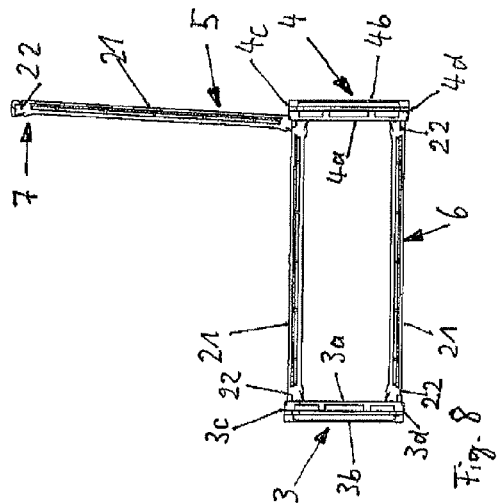
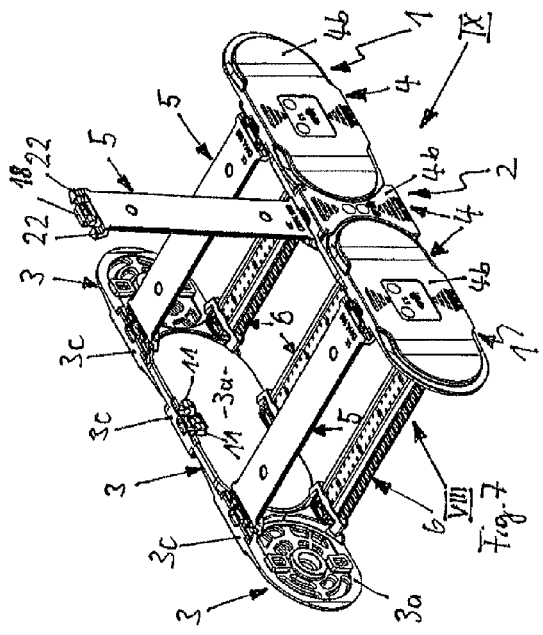
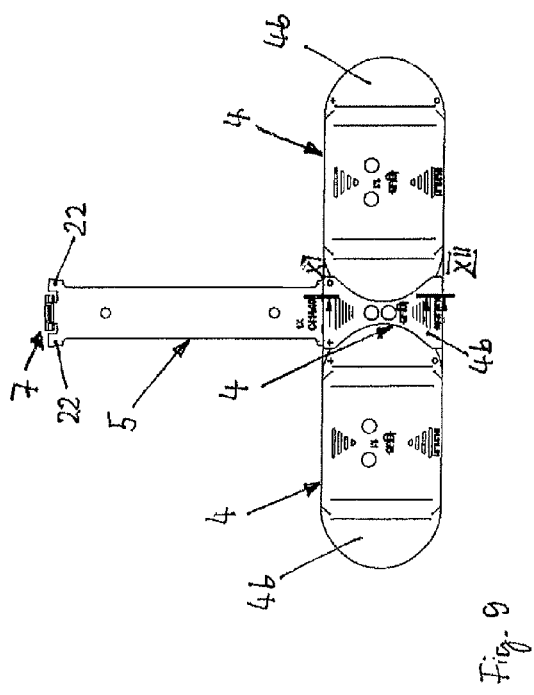
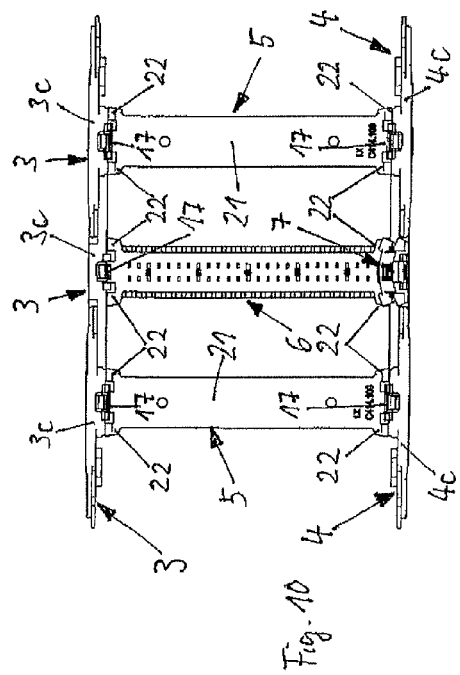

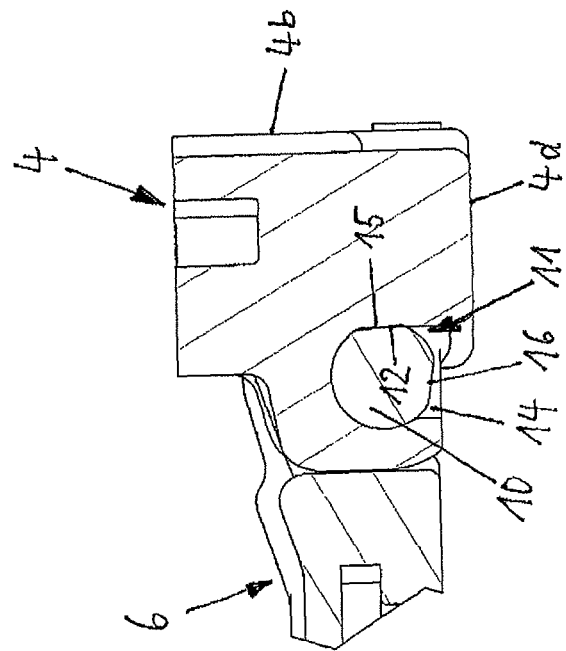
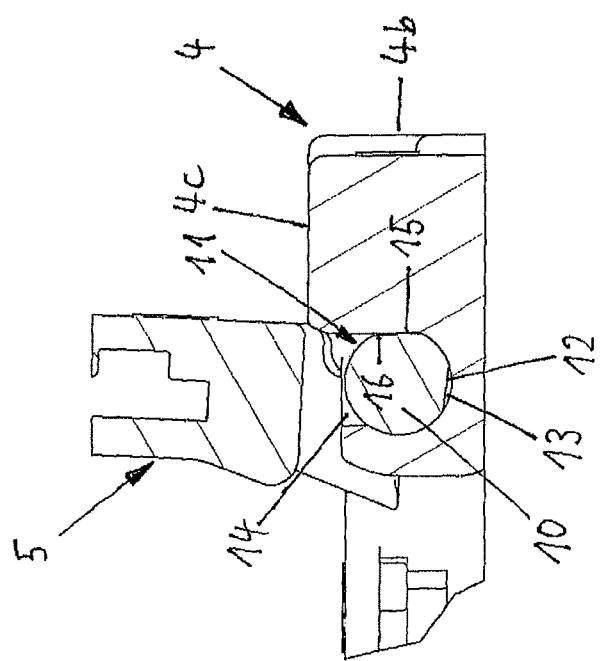

ENERGY GUIDING CHAIN

The invention relates to an energy guiding chain for guiding cables, hoses and the like from a first connecting point to a second connecting point that moves relative to the first connecting point, comprising a plurality of plastic chain links that can be pivoted relative to each other over a certain pivoting angle, each of which comprises two side straps displaying inner sides facing towards the interior of the chain, outward-facing outer sides and narrow faces running perpendicularly to them and in the longitudinal direction of the side straps, where the side straps form opposite strap strands transversely to their longitudinal direction, and at least some of the opposite side straps are connected to each other by cross-members, at least some of which display a bearing area on at least one of their ends that interacts with a bearing seat, located on the side strap facing towards said end of the cross-member, in articulated fashion for pivoting the cross-member between a closed position and an opened position, where the bearing area displays at least one journal of essentially cylindrical design, the axis of which is oriented in the longitudinal direction of the side strap, and the bearing seat displays a pocket-shaped journal seat with a space that corresponds to the journal, is essentially cylindrical and into which the journal can be inserted.

An energy guiding chain of this kind is known from DE 20 2011 004 762 U. On this chain, the cross-member displays, in the middle area of both its ends, bearing areas that are designed as journals. Located on the inner side of the side straps, in the vicinity of their narrow faces, are bearing seats that display journal seats into which the journals of the cross-member can be inserted. The bearing seats project on the inner sides of the side straps, towards the interior of the chain.

On the known energy guiding chain, the side straps each display a snap-fitting device with a snap-in nose that interacts with a snap-in strip, located on the fastening end of the cross-member, such that the snap-in nose reaches over the snap-in strip when the cross-member is in its locked position. In this context, the snap-in strip is located radially outside the common axis of the journals, facing towards the adjacent side strap, and, in locked position of the cross-member, the snap-fitting device is located on the side of the snap-in strip facing towards the adjacent side strap in such a way that, when the cross-member is pivoted about the common axis of the journals inserted in the journal seats, into the fully opened position of the cross-member, the snap-in strip can be moved below and beyond the snap-in nose.

Furthermore, the chain links of the known energy guiding chain display both upper and lower cross-members, the fastening ends of which display the aforementioned bearing areas, each with a snap-in strip, that interact with the aforementioned bearing seats, each with a snap-fitting device.

To insert or replace lines, the known energy guiding chain can be opened in that, for example, the upper cross-members are disconnected from the side straps on one side and, based on their articulated connection to the opposite side straps, pivoted into the fully opened position. Particularly in opened state, the angular stability of the side straps relative to the lower cross-members connecting them is limited owing to their articulated connection to the side straps.

The object of the present invention is to improve the angular stability of the side straps when the cross-members are opened on one side.

According to the invention, the object is solved in that the essentially cylindrical journals on the fastening ends of the cross-members display a first flattened section on their lateral surface, where the first flattened section lies parallel to the axis of the essentially cylindrical journal, and the essentially cylindrical space of the bearing seat on the adjacent side strap, receiving the journal, displays a flattened section, where the latter and the first flattened section of the journal are arranged in such a way relative to each other that, in the closed position of the cross-member, the flattened section of the cylindrical space and the first flattened section of the essentially cylindrical journal are opposite each other.

Designing the journal, and the journal seat receiving it, in accordance with the invention guarantees particularly stable bearing of a cross-member in its closed position perpendicular to the side strap. Pivoting of the side straps outwards into a position parallel to the cross-members, which may be desirable under certain circumstances, requires substantial force that is not achieved during normal handling of the energy guiding chain for inserting and replacing lines.

In the cross-section, the first flattened section of the journal forms a secant of the perimeter circle of the cylindrical journal. The length of the secant is preferably dimensioned in such a way that the associated circular sector displays an angle of at least 40°.

The flattened section of the essentially cylindrical space of the journal seat likewise forms a secant of the perimeter circle of the cylindrical space in the cross-section.

In the closed position of the cross-member, the first flattened section of the journal and the flattened section of the essentially cylindrical space of the journal seat preferably lie against each other.

In an advantageous development of the invention, the journal displays a second flattened section, lying parallel to the axis of the essentially cylindrical journal, where the second flattened section is located on the journal in such a way that, in the fully opened position of the cross-member, it lies opposite the flattened section of the essentially cylindrical space of the journal seat.

Owing to this measure, the cross-member is likewise in a stable locked position relative to the side strap when in its fully opened position.

In the cross-section, the second flattened section of the journal forms a secant of the perimeter circle of the essentially cylindrical journal. The length of the secant is preferably dimensioned in such a way that the associated circular sector displays an angle of at least 40°.

The circular sectors associated with the first and second flattened sections can display different angles, such that different forces are necessary to move the cross-member from its locked position in its closed position and from its locked position in its fully opened position.

The essentially cylindrical space of the journal seat can be accessible towards the adjacent narrow face of the side strap through an insertion opening, in relation to which the essentially cylindrical space is wider, such that the journal can be snapped into the journal seat.

The flattened section of the essentially cylindrical space can be located on the wall of the journal seat adjacent to the outer side of the side strap.

The flattened section can furthermore be arranged parallel to the outer side of the side strap. It is preferably arranged flush with the wall of the insertion opening adjacent to the outer side of the side strap.

In a preferred embodiment, the first flattened section is arranged relative to the second flattened section of the essentially cylindrical journal at an angle greater than 90°, which is swept when pivoting the cross-member between its closed and fully opened positions.

The cross-member advantageously displays a shoulder on its fastening end, on which two journals displaying a common axis are located, each of which can be inserted into a pocket-shaped journal seat located on the inner side of the side strap.

The further structural design of the energy guiding chain according to the invention can at least partly include the features of the energy guiding chain known from DE 20 2011 004 762 U.

Practical examples of the invention are described in more detail below on the basis of the drawing.

Figure 3:
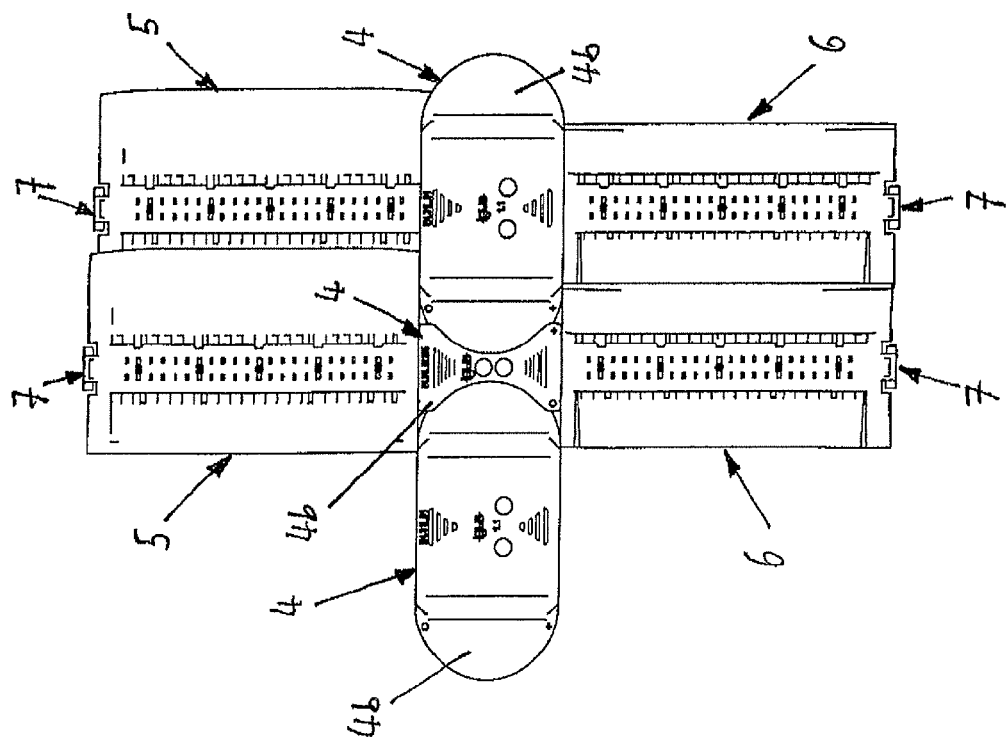

The Figures show the following:

FIG. 1 A perspective view of a section of a first practical example of an energy guiding chain, comprising three connected chain links, FIG. 2 A front view of the section shown in FIG. 1, in the direction of arrow II, FIG. 3 A side view of the section shown in FIG. 1, in the direction of arrow III, FIG. 4 A top view of the section shown in FIG. 1, FIG. 5 A perspective view of an upper cross-member of the section shown in FIG. 1, FIG. 6 An enlarged view of the area circled in FIG. 5, FIG. 7 A perspective view of a section of a second practical example of an energy guiding chain, comprising three connected chain links, FIG. 8 A front view of the section shown in FIG. 7, in the direction of arrow VIII, FIG. 9 A side view of the section shown in FIG. 7, in the direction of arrow IX, FIG. 10 A top view of the section shown in FIG. 7, FIG. 11 A section along line XI in FIG. 9, and FIG. 12 A section along line XII in FIG. 9.

The section of an energy guiding chain shown in FIGS. 1-6 consists of three chain links, where outer chain links 1 display opposite side straps 3, which overlap side straps 4 of inner chain link 2 from the outside. Side straps 3 and 4 form strap strands that lie opposite each other transversely to their longitudinal direction and continue over the entire length of the energy guiding chain.

The energy guiding chain is made up of a plurality of chain links 1, 2, which can be pivoted relative to each other over a certain pivoting angle, and extends from a first connecting point (not shown in the drawing) to a second connecting point (not shown in the drawing), which moves relative to the first connecting point.

As can be seen from FIG. 1, each side strap 3, 4 displays an inner side 3a, 4a, facing towards the interior of the chain, an outward-facing outer side 3b, 4b and narrow faces 3c, 3d, 4c, 4d, running perpendicularly to them and in the longitudinal direction of the side straps.

Opposite side straps 3, 4 can be connected to each other by upper cross-members 5 and lower cross-members 6. The upper cross-members are designed as top walls and the lower cross-members as bottom walls. The top walls of adjacent chain links can overlap over the entire pivoting angle, as can the bottom walls, and can thus form a closed energy guiding chain. FIGS. 1-4 of the drawing show cross-members 5 and 6 of front chain link 1 in their closed position, while cross-members 5 and 6 of the two rearward chain links 2 and 1 are shown in their opened position.

The section of an energy guiding chain shown in FIGS. 7-10 differs from the first practical example only in that the upper cross-members 5 and the lower cross-members 6 of adjacent chain links are arranged a distance apart from each other. They thus form an energy guiding chain that is open in the gaps between cross-members 5 and 6.

If no reference is made to different embodiments of the cross-members below, reference numbers 5 and 6 are used to describe both types of cross-member.

Cross-members 5, 6 display a bearing area 7 on each of their two ends that interacts with a bearing seat 8, located on the side strap 3 or 4 facing towards said end of the cross-member, in articulated fashion for pivoting the cross-member between its closed and opened positions.

Journals 10 are designed in such a way that they can each be inserted into a pocket-shaped journal seat 11, located on bearing seat 8, as shown in FIGS. 11 and 12.

As can particularly be seen from FIGS. 6, 11 and 12, journals 10 are of essentially cylindrical design, with a first flattened section 12 on their lateral surface that runs parallel to the axis of journals 10. Journal seat 11 assigned to journal 10 displays a cylindrical space 13, corresponding to journal 10, which is wider in relation to an insertion opening 14 for journal 10, such that journal 10 can be snapped into journal seat 11. The wall of cylindrical space 13 displays a flattened section 15, corresponding to the first flattened section of journal 10, where the latter and first flattened section 12 of journal 10 are arranged relative to each other in such a way that, in the closed position of cross-member 5, 6, flattened section 15 of journal seat 11 and first flattened section 12 of journal 10 lie against each other.

As shown in FIGS. 11 and 12, journal 10 displays a second flattened section 16, running parallel to the axis of journal 10, where second flattened section 16 is arranged on journal 10 in such a way that it lies against flattened section 15 of journal seat 11 when cross-member 5, 6 is in its fully opened position. In their cross-sections, flattened sections 12 and 16 of journal 10 form secants of the perimeter circle of essentially cylindrical journal 10, and flattened section 15 of journal seat 11 forms a secant of the perimeter circle of essentially cylindrical space 13 of journal seat 11.

As a result of the above-described design of journal 10 and journal seat 11, journal 10 is in a locked position in journal seat 11 when cross-member 5, 6 is in both its fully opened position and its closed position, as shown in FIGS. 11 and 12, respectively.

Flattened section 15 of essentially cylindrical space 13 is located on wall 17 of journal seat 11 adjacent to outer side 3b, 4b of side strap 3 or 4. Furthermore, flattened section 15 is arranged parallel to outer side 3b, 4b of side strap 3 or 4, specifically arranged flush with wall 18 of insertion opening 14 adjacent to outer side 3b, 4b of side strap 3 or 4.

As can likewise be seen from FIGS. 11 and 12, first flattened section 12 and second flattened section 16 of journal 10 are arranged at an angle greater than 90° relative to each other, which is swept when pivoting cross-member 5, 6 between its closed and fully opened positions.

For fastening the two ends of cross-members 5, 6 on adjacent side straps 3, 4, the latter display, in the area of their upper narrow faces 3c, 4c and their lower narrow faces 3d, 4d, between journal seats 11, a snap-fitting device with a snap-in nose 17, as can be seen from FIGS. 4, 7 and 10. Snap-in nose 17 interacts with a snap-in strip 18, located on the corresponding fastening end of cross-member 5, 6, such that snap-in nose 17 reaches over snap-in strip 18 when the cross-member is in its locked position and its closed position in relation to opposite side strap 3, 4. In keeping with the arrangement of snap-in nose 17 between journal seats 11, snap-in strip 18 is offset towards the interior of the chain in the area between the bearing areas of journal 10, and located radially outside the common axis of journals 10, facing towards adjacent side strap 3, 4.

The snap-fitting device is located on adjacent side strap 3, 4, opposite snap-in strip 18, in such a way that, when cross-member 5, 6 is pivoted about the common axis of journals 10 inserted in journal seats 11, into the fully opened position of cross-member 5, 6, snap-in strip 17 can be moved below and beyond snap-in nose 17.

On its fastening end, outside bearing area 7, each cross-member 5, 6 displays a contact area 19, a contact surface 20 of which lies against inner side 3*a*, 4*a* of side strap 3 or 4 in the closed position of cross-member 5, 6.

To enable opening of cross-member 5, 6, provision is made on the practical example of a chain that can be closed on all four sides, shown in FIGS. 1-6, for side 21 of contact area 19 of cross-member 5, 6, facing outwards from the interior of the chain, to have a convex curvature towards its contact surface 20. Instead of the convex curvature, provision can also be made for a linear inclination of contact area 19 towards contact surface 20. Together with inner side 3*a*, 4*a* of adjacent side strap 3 or 4, contact area 19 encloses an angle of less than 90° at the point of the contact surface, such that cross-member 5, 6 can be pivoted upwards from its closed position to its fully opened position without being impeded by areas on inner side 3*a*, 4*a* of side strap 3 or 4.

In the practical example of an open energy guiding chain, shown in FIGS. 7-10, contact areas 22, located on the two sides of journals 10, display a right-angle bend in the direction of the interior of the chain, such that, when cross-member 5, 6 is pivoted into the fully opened position shown in FIG. 7, the edge of narrow faces 3*c*, 3*d* or 4*c*, 4*d*, of side strap 3 or 4 facing towards the interior of the chain engages the right-angled contact area 22 of cross-member 5, 6. The inward-lying side of the right-angle bend of contact area 22 serves as a stop face against adjacent narrow face 3*c*, 3*d* or 4*c*, 4*d* of side strap 3 or 4, and thus to additionally limit the pivoting angle of cross-member 5, 6.

LIST OF REFERENCE NUMBERS

1 Chain link
2 Chain link
2 Side strap
3*a* Inner side
3*b* Outer side
3*c* Narrow face
3*d* Narrow face
4 Side strap
4*a* Inner side
4*b* Outer side
4*c* Narrow face
4*d* Narrow face
5 Upper cross-member
5*a* Telescopically overlapping surface
5*b* Telescopically overlapping surface
6 Lower cross-member
6*a* Telescopically overlapping surface
6*b* Telescopically overlapping surface
7 Bearing area
8 Bearing seat
9 Shoulder
10 Journal
11 Journal seat
12 First flattened section
13 Cylindrical space
14 Insertion opening
15 Flattened section
16 Second flattened section
17 Snap-in nose
18 Snap-in strip
19 Contact area
20 Contact surface
21 Outward-facing side
22 Contact area

What is claimed is:

1. An energy guiding chain for guiding supply lines from a first connecting point to a second connecting point that moves relative to the first connecting point, comprising:
    a plurality of plastic chain links pivotable relative to each other over a pivoting angle,
    each plastic chain link of the plurality of chain links comprising two side straps, each side strap of the two side straps having an inner side facing towards an interior of the chain, an outer side facing outwards from the chain and opposing narrow faces arranged perpendicular to the inner side and the outer side and extending in a longitudinal direction of the side strap,
    wherein the side straps form opposite strap strands transverse to the longitudinal direction,
    wherein at least some of the side straps of the opposite strap strands are connected to each other by a cross-member, wherein at least one end of the cross-member includes a bearing area that interacts with a bearing seat located on an adjacent side strap facing towards the end of the cross-member having the bearing area in articulated fashion, for pivoting the cross-member between a closed position and an a completely opened position,
    wherein the bearing area includes at least one journal, wherein the journal has an axis oriented in the longitudinal direction of the side strap,
    wherein the bearing seat includes at least one pocket-shaped journal seat having a space to receive the journal, and the journal is insertable into the pocket-shaped journal seat,
    wherein the journal has a first flattened section on a lateral surface, and the first flattened section of the journal is parallel to the journal axis,
    wherein the journal seat of the bearing seat on the adjacent side strap to receive the journal includes a wall having a flattened section, and
    wherein the flattened section of the journal seat and the first flattened section of the journal are arranged such that, in the closed position of the cross-member, the flattened section of the journal seat and the first flattened section of the journal are opposite each other.

2. The energy guiding chain according to claim 1, wherein the first flattened section forms a secant of a perimeter circle of the journal in cross-section, and is dimensioned such that a circular sector associated with the secant has an angle of at least 40°.

3. The energy guiding chain according to claim 1, wherein in the closed position of the cross-member, the first flattened section of the journal and the flattened section of the journal seat lie against each other.

4. The energy guiding chain according to claim 1, wherein the journal includes a second flattened sectioning parallel to the journal axis, and
    wherein the flattened section of the journal seat and the second flattened section of the journal are arranged such that, in the fully opened position of the cross-member, the flattened section of the journal seat and the second flattened section of the journal are opposite each other.

5. The energy guiding chain according to claim 4, wherein the second flattened section forms a secant of a perimeter circle of the journal in cross-section, and is dimensioned such that a circular sector associated with the secant has an angle of at least 40°.

6. The energy guiding chain according to claim 4, wherein the first flattened section is arranged at an angle relative to the second flattened section of greater than 90°, which is swept when the cross-member is pivoted between the closed position and the fully opened position.

7. The energy guiding chain according to claim 1, wherein the wall of the journal seat having the flattened section is located adjacent to the outer side of the side strap.

8. The energy guiding chain according to claim 7, wherein the flattened section is parallel to the outer side of the side strap.

9. The energy guiding chain according to claim 1, wherein the journal is essentially cylindrical,
wherein the space of the journal seat to receive the journal is essentially cylindrical and is accessible through an insertion opening,
wherein the essentially cylindrical space is wider than the insertion opening such that the journal is snapable into the essentially cylindrical space of the journal seat.

10. The energy guiding chain according to claim 1, wherein the at least one journal comprises two journals located on the journal axis, wherein the at least one pocket-shaped journal seat comprises two pocket-shaped journal seats located on the inner side of the side strap, and wherein the at least one end of the cross-member includes a shoulder on which the two journals are arranged,
wherein each of the journals is insertable into a respective one of the pocket-shaped journal seats located on the inner side of the side strap.

11. An energy guiding chain for guiding supply lines from a first connecting point to a second connecting point that moves relative to the first connecting point, comprising:
a plurality of plastic chain links pivotable relative to each other over a pivoting angle,
each plastic chain link of the plurality of chain links comprising two side straps, each side strap of the two side straps having an inner side facing towards an interior of the chain, an outer side facing outwards from the chain and opposing narrow faces arranged perpendicular to the inner side and the outer side and extending in a longitudinal direction of the side strap,
wherein the side straps form opposite strap strands transverse to the longitudinal direction,
wherein at least some of the side straps of the opposite strap strands are connected to each other by a cross-member, wherein at least one end of the cross-member includes a bearing area that interacts with a bearing seat located on an adjacent side strap facing towards the end of the cross-member having the bearing area in articulated fashion, for pivoting the cross-member between a closed position and an a completely opened position,
wherein the bearing area includes at least one journal, wherein the journal has an axis oriented in the longitudinal direction of the side strap,
wherein the bearing seat includes at least one pocket-shaped journal seat having a space to receive the journal, and the journal is insertable into the pocket-shaped journal seat,
wherein the journal has a first flattened section on a lateral surface, and the first flattened section of the journal is parallel to the journal axis,
wherein the journal seat of the bearing seat on the adjacent side strap to receive the journal includes a wall having a flattened section,
wherein the flattened section of the journal seat and the first flattened section of the journal are arranged such that, in the closed position of the cross-member, the flattened section of the journal seat and the first flattened section of the journal are opposite each other,
wherein the journal is essentially cylindrical,
wherein the space of the journal seat to receive the journal is essentially cylindrical and is accessible through an insertion opening, and
wherein the essentially cylindrical space is wider than the insertion opening such that the journal is snapable into the essentially cylindrical space of the journal seat.

12. The energy guiding chain according to claim 11, wherein the first flattened section forms a secant of a perimeter circle of the journal in cross-section, and is dimensioned such that a circular sector associated with the secant has an angle of at least 40°.

13. The energy guiding chain according to claim 11, wherein in the closed position of the cross-member, the first flattened section of the journal and the flattened section of the journal seat lie against each other.

14. The energy guiding chain according to claim 11, wherein the journal includes a second flattened section parallel to the journal axis, and
wherein the flattened section of the journal seat and the second flattened section of the journal are arranged such that, in the fully opened position of the cross-member, the flattened section of the journal seat and the second flattened section of the journal are opposite each other.

15. The energy guiding chain according to claim 14, wherein the second flattened section forms a secant of a perimeter circle of the journal in cross-section, and is dimensioned such that a circular sector associated with the secant has an angle of at least 40°.

16. The energy guiding chain according to claim 14, wherein the first flattened section is arranged at an angle relative to the second flattened section of greater than 90°, which is swept when the cross-member is pivoted between the closed position and the fully opened position.

17. The energy guiding chain according to claim 11, wherein the wall of the journal seat having the flattened section is located adjacent to the outer side of the side strap.

18. The energy guiding chain according to claim 17, wherein the flattened section is parallel to the outer side of the side strap.

19. The energy guiding chain according to claim 11, wherein the at least one journal comprises two journals located on the journal axis, wherein the at least one pocket-shaped journal seat comprises two pocket-shaped journal seats located on the inner side of the side strap, and wherein the at least one end of the cross-member includes a shoulder on which the two journals are arranged,
wherein each of the journals is insertable into a respective one of the pocket-shaped journal seats located on the inner side of the side strap.

20. An energy guiding chain for guiding supply lines from a first connecting point to a second connecting point that moves relative to the first connecting point, comprising:
a plurality of plastic chain links pivotable relative to each other over a pivoting angle,
each plastic chain link of the plurality of chain links comprising two side straps, each side strap of the two side straps having an inner side facing towards an interior of the chain, an outer side facing outwards from the chain and opposing narrow faces arranged perpendicular to the inner side and the outer side and extending in a longitudinal direction of the side strap, wherein the side straps form opposite strap strands transverse to the longitudinal direction, wherein at least some of the side straps of the opposite strap strands are connected to each other by a cross-member, wherein at least one end of the cross-member includes a bearing area that interacts with a bearing seat located on an adjacent side strap facing towards the end of the cross-member having the bearing area in articulated fashion for pivoting the cross-member between a closed position and an a completely opened position, wherein the bearing area includes at least one journal, wherein the journal has an axis oriented in the longitudinal direction of the side strap, wherein the bearing seat includes at least one pocket-shaped journal seat having a space to receive the journal, and the journal is insertable into the pocket-shaped journal seat, wherein the journal has a first flattened section on a lateral surface, and the first flattened section of the journal is parallel to the journal axis, wherein the journal seat of the bearing seat on the adjacent side strap to receive the journal includes a wall having a flattened section, wherein the flattened section of the journal seat and the first flattened section of the journal are arranged such that, in the closed position of the cross-member, the flattened section of the journal seat and the first flattened section of the journal are opposite each other, wherein the journal includes a second flattened section parallel to the journal axis, and wherein the flattened section of the journal seat and the second flattened section of the journal are arranged such that, in the fully opened position of the cross-member, the flattened section of the journal seat and the second flattened section of the journal are opposite each other.

21. The energy guiding chain according to claim 20, wherein the first flattened section forms a secant of a perimeter circle of the journal in cross-section, and is dimensioned such that a circular sector associated with the secant has an angle of at least 40°.

22. The energy guiding chain according to claim 20, wherein in the closed position of the cross-member, the first flattened section of the journal and the flattened section of the journal seat lie against each other.

23. The energy guiding chain according to claim 20, wherein the second flattened section forms a secant of a perimeter circle of the journal in cross-section, and is dimensioned such that a circular sector associated with the secant has an angle of at least 40°.

24. The energy guiding chain according to claim 20, wherein the first flattened section is arranged at an angle relative to the second flattened section of greater than 90°, which is swept when the cross-member is pivoted between the closed position and the fully opened position.

25. The energy guiding chain according to claim 20, wherein the wall of the journal seat having the flattened section is located adjacent to the outer side of the side strap.

26. The energy guiding chain according to claim 25, wherein the flattened section is parallel to the outer side of the side strap.

27. The energy guiding chain according to claim 20, wherein the journal is essentially cylindrical,
   wherein the space of the journal seat to receive the journal is essentially cylindrical and is accessible through an insertion opening, and
   wherein the essentially cylindrical space is wider than the insertion opening such that the journal is snapable into the essentially cylindrical space of the journal seat.

28. The energy guiding chain according to claim 20, wherein the at least one journal comprises two journals located on the journal axis, wherein the at least one pocket-shaped journal seat comprises two pocket-shaped journal seats located on the inner side of the side strap, and wherein the at least one end of the cross-member includes a shoulder on which the two journals are arranged,
   wherein each of the journals is insertable into a respective one of the pocket-shaped journal seats located on the inner side of the side strap.

* * * * *

UNITED STATES PATENT AND TRADEMARK OFFICE
CERTIFICATE OF CORRECTION

PATENT NO. : 9,494,215 B2  Page 1 of 1
APPLICATION NO. : 14/782413
DATED : November 15, 2016
INVENTOR(S) : Hermey et al.

It is certified that error appears in the above-identified patent and that said Letters Patent is hereby corrected as shown below:

In the Claims

In Column 6, Line 31, in Claim 1, after "and" delete "an".

In Column 6, Line 60, in Claim 4, delete "sectioning" and insert -- section --, therefor.

In Column 7, Line 22, in Claim 9, after "opening," insert -- and --.

In Column 7, Line 57, in Claim 11, after "and" delete "an".

In Column 9, Line 14, in Claim 20, after "and" delete "an".

Signed and Sealed this
First Day of August, 2017

Joseph Matal
*Performing the Functions and Duties of the*
*Under Secretary of Commerce for Intellectual Property and*
*Director of the United States Patent and Trademark Office*